US012669342B2

(12) United States Patent

Hickey et al.

(10) Patent No.: US 12,669,342 B2

(45) Date of Patent: Jun. 30, 2026

(54) VEHICLE SYSTEM

(71) Applicant: GM Global Technology Operations LLC, Detroit, MI (US)

(72) Inventors: Ryan Patrick Hickey, Austin, TX (US); Russell A. Patenaude, Macomb Township, MI (US); Matthew Edward Gilbert-Eyres, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 240 days.

(21) Appl. No.: 18/515,772

(22) Filed: Nov. 21, 2023

(65) Prior Publication Data

US 2025/0164258 A1 May 22, 2025

(51) Int. Cl.
*G01C 21/34* (2006.01)
*G07C 5/00* (2006.01)
*H04W 4/40* (2018.01)

(52) U.S. Cl.
CPC ......... *G01C 21/3469* (2013.01); *G07C 5/008* (2013.01); *H04W 4/40* (2018.02)

(58) Field of Classification Search
CPC ............................. H04W 4/40; G01C 21/3469
USPC ............................................................. 701/22
See application file for complete search history.

(56) References Cited

U.S. PATENT DOCUMENTS

2012/0053771 A1* 3/2012 Yoshida .................. B60L 55/00
                                                          701/22
2019/0232792 A1* 8/2019 Ahmed .................... B60L 53/66
2024/0359586 A1* 10/2024 Schwarze .............. B60L 55/00

FOREIGN PATENT DOCUMENTS

EP          4438456 A1 * 10/2024 .............. B60L 53/30

* cited by examiner

*Primary Examiner* — Todd Melton
*Assistant Examiner* — Vincent Feng
(74) *Attorney, Agent, or Firm* — Honigman LLP; Matthew H. Szalach; Jonathan P. O'Brien

(57) ABSTRACT

A vehicle system includes a vehicle processor for storing data including vehicle location and vehicle data. The vehicle system also includes a server communicatively coupled to the vehicle processor and configured to transfer energy from a vehicle battery to a transfer station based on the vehicle location and the vehicle data.

18 Claims, 6 Drawing Sheets

VEHICLE SYSTEM

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates generally to a vehicle system configured to comply with state-of-charge limitations.

Many vehicles are now electric vehicles powered using batteries. Batteries, particularly fully charged batteries, may pose a fire risk under certain conditions. Accordingly, electric vehicles being transported are often maintained at a charge below a maximum charge and, ideally, within a safety charging capacity window to mitigate any fire risks. For example, automotive ferry operators often enlist a state-of-charge limitation (e.g., 20-50% of full battery range) for an electric vehicle prior to the vehicle being allowed to be loaded onto a ferry.

To comply with state-of-charge limitations, a vehicle owner or other user may be required to drive the vehicle in an effort to reduce the range of the vehicle's battery, which may add travel time and cause a user to miss their desired ferry. As such, a need remains to safely and easily comply with state-of-charge limitations without a vehicle owner or user needing to unnecessarily drive a vehicle in an effort to reduce battery life.

SUMMARY

In one configuration, a vehicle system includes a vehicle processor for storing data including vehicle event data, vehicle mode, and vehicle location. The vehicle location includes one or more of current vehicle location, desired vehicle destination, or route information. The vehicle system also includes a server communicatively coupled to the vehicle processor and configured to start battery depletion activities based on the vehicle location including one or more of current vehicle location, desired vehicle destination, or route information, and the vehicle event data. The battery depletion activities include one or more of enabling max accessory loads including one or more of a chiller operation increase, an increase in coolant flow rate, additional vehicle imaging, activating vehicle sensors to a high-load mode, activating discharge of cell groups by activating cell balancing resistors, and activating inefficient operation of vehicle components including one or more of a vehicle motor or vehicle inverter.

The vehicle system may also include one or more of the following optional features. For example, the vehicle location may include one or more of Global Positioning System (GPS) location and traffic information. Additionally, the server may be configured to determine an amount of energy required for the vehicle to arrive at a destination to determine if the vehicle battery will be below a certain battery level by the time the vehicle arrives at the vehicle destination. Moreover, the vehicle location may include route information indicating ferry transport along the route. Additionally, the server may be configured to continue battery depletion activities until the vehicle is in compliance with ferry transportation regulations. Moreover, the server may be configured to continue battery depletion activities until the vehicle battery life is between 20%-50% of maximum charge. Additionally, a vehicle may incorporate the vehicle system.

In another configuration, a vehicle system includes a vehicle processor for storing data including vehicle location and vehicle data. The vehicle system also includes a server communicatively coupled to the vehicle processor and configured to transfer energy from a vehicle battery to a transfer station based on vehicle location and the vehicle event data. The vehicle location includes one or more of GPS location, current vehicle location, vehicle destination, route information, and traffic information.

The vehicle system may also include one or more of the following optional features. For example, the server may be configured to continue transferring energy from the vehicle battery until the vehicle is in compliance with ferry transportation regulations. Additionally, the server may be configured to continue transferring energy from the vehicle battery until the vehicle battery life is between 20%-50% of maximum charge. Moreover, the transfer station may be configured to transfer the energy from the vehicle battery to a battery of a second vehicle. Further, the second vehicle may be a ferry. Additionally, the second vehicle may be a land vehicle. Moreover, a vehicle may incorporate the vehicle system.

In another configuration, a vehicle system includes a vehicle processor for storing data including vehicle location and vehicle event data. The vehicle system also includes a server communicatively coupled to the vehicle processor and configured to transfer energy from a vehicle battery to a second vehicle based on vehicle location and the vehicle event data.

The vehicle system may also include one or more of the following optional features. For example, the server may be configured to transfer energy from the vehicle battery to a transfer station before the energy is transferred to the second vehicle. Additionally, the server may be configured to transfer energy from the vehicle battery until the vehicle is in compliance with ferry transportation regulations. Moreover, the server may be configured to transfer energy from the vehicle battery until the vehicle battery life is between 20%-50% of maximum charge. Additionally, a vehicle may incorporate the vehicle system.

BRIEF DESCRIPTION OF THE DRAWINGS

The drawings described herein are for illustrative purposes only of selected configurations and are not intended to limit the scope of the present disclosure.

Corresponding reference numerals indicate corresponding parts throughout the drawings.

DETAILED DESCRIPTION

Figure 1:
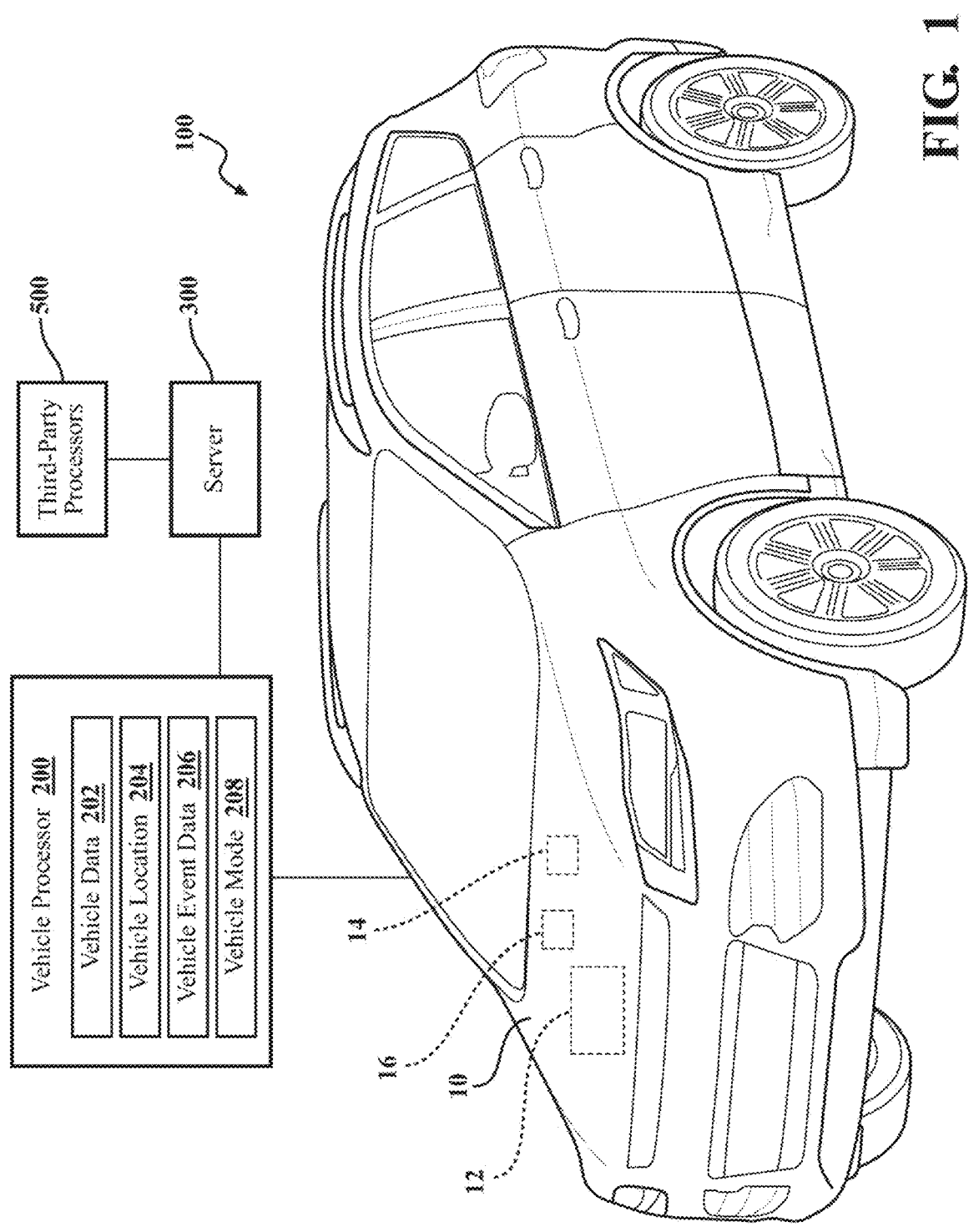
FIG. 1 is a perspective view of a vehicle incorporating a vehicle system according to one aspect of the present disclosure.

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms "first," "second," "third," etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

In this application, including the definitions below, the term "module" may be replaced with the term "circuit." The term "module" may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term "code," as used above, may include software, firmware, and/or microcode, and may refer to programs, routines, functions, classes, and/or objects. The term "shared processor" encompasses a single processor that executes some or all code from multiple modules. The term "group processor" encompasses a processor that, in combination with additional processors, executes some or all code from one or more modules. The term "shared memory" encompasses a single memory that stores some or all code from multiple modules. The term "group memory" encompasses a memory that, in combination with additional memories, stores some or all code from one or more modules. The term "memory" may be a subset of the term "computer-readable medium." The term "computer-readable medium" does not encompass transitory electrical and electromagnetic signals propagating through a medium, and may therefore be considered tangible and non-transitory memory. Non-limiting examples of a non-transitory memory include a tangible computer readable medium including a nonvolatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Referring to FIGS. 1-6, a vehicle system 100 includes a vehicle processor 200 and a server 300 communicatively coupled with the vehicle processor 200. In FIG. 1, the vehicle system 100 is incorporated into a vehicle 10. The vehicle 10 may be an electric vehicle 10 (EV) and may include autonomous or semi-autonomous capabilities. Alternatively, the vehicle 10 may be a hybrid vehicle 10 incorporating both EV and internal combustion engine (ICE) components and capabilities. The vehicle 10 also includes a vehicle battery 12 configured to provide power to the vehicle 10. The vehicle battery 12 is re-chargeable and includes a vehicle battery life between 0% and 100% with 0% representing no charge to the vehicle battery 12 and 100% representing a full charge of the vehicle battery 12. Additionally, the vehicle 10 may include a plurality of vehicle sensors 14 and/or vehicle cameras 16 configured to provide data to the vehicle processor 200.

The vehicle processor 200 stores vehicle data 202 of the vehicle 10. The vehicle data 202 includes vehicle location 204, vehicle event data 206, and vehicle mode 208. The vehicle location 204 generally pertains to a location of the vehicle 10. More specifically, the vehicle location 204 includes one or more of current vehicle location, route information, and traffic information. The current vehicle location generally pertains to the current location of the vehicle 10. The current vehicle location may be obtained from a Global Position System (GPS) or other navigation system, may be obtained from a user device such as a cellular phone or tablet, and/or may be obtained from a third-party processor 500 and communicated to the vehicle processor 200. The route information generally pertains to a route the vehicle 10 is traveling, including origin and destination information. The route information may be obtained from user input, a vehicle navigation system, past driver activity, or a third-party processor 500 and communicated to the vehicle processor 200. Moreover, the route information may include data indicating a ferry transport along the route. Further, the route information may additionally include information related to the ferry transport including the ferry schedule or water conditions, which may affect travel of the ferry along the route.

The traffic information generally pertains to information related to traffic along the route. The traffic information may include road closures, weather data, ferry wait times or other information related to the time and/or energy from the vehicle battery 12 required to reach the destination. Moreover, the vehicle location 204 may be constantly changing such that the vehicle location 204 may be continually sensed and/or obtained during vehicle operation.

The vehicle event data 206 generally pertains to actions the vehicle 10 takes during operation. Vehicle event data 206 may be gathered by any vehicle sensors 14 and/or vehicle cameras 16 and may be communicated to the vehicle processor 200 for further processing. Additionally, the vehicle event data 206 may include vehicle speed, vehicle braking, or other movement by the vehicle 10 requiring energy from the vehicle battery 12. More specifically, the vehicle speed may pertain to the current speed of the vehicle 10, whether the vehicle 10 has stopped, whether the vehicle 10 has quickly changed speed, and other vehicle speed-related events. Further, the vehicle braking may include current brake status and/or predicted future brake status. Moreover, the vehicle event data 206 may be constantly changing such that the vehicle event data 206 may be continually sensed and/or obtained during vehicle operation.

The vehicle mode 208 generally pertains to operations of the vehicle 10 that are currently active. More specifically, the vehicle mode 208 relates to any vehicle mode or operation that may affect the battery life of the vehicle 10. For example, the vehicle mode 208 may include, but is not limited to, operational loads including accessory loads, operation of individual vehicle components including vehicle motor or vehicle inverter, resistor mode, vehicle sensor modes, or other vehicle modes such as sport mode, which require use of the vehicle battery 12. Additionally, the vehicle mode 208 may be constantly changing such that the vehicle mode 208 may be continually sensed and/or obtained during vehicle operation.

Figure 3:
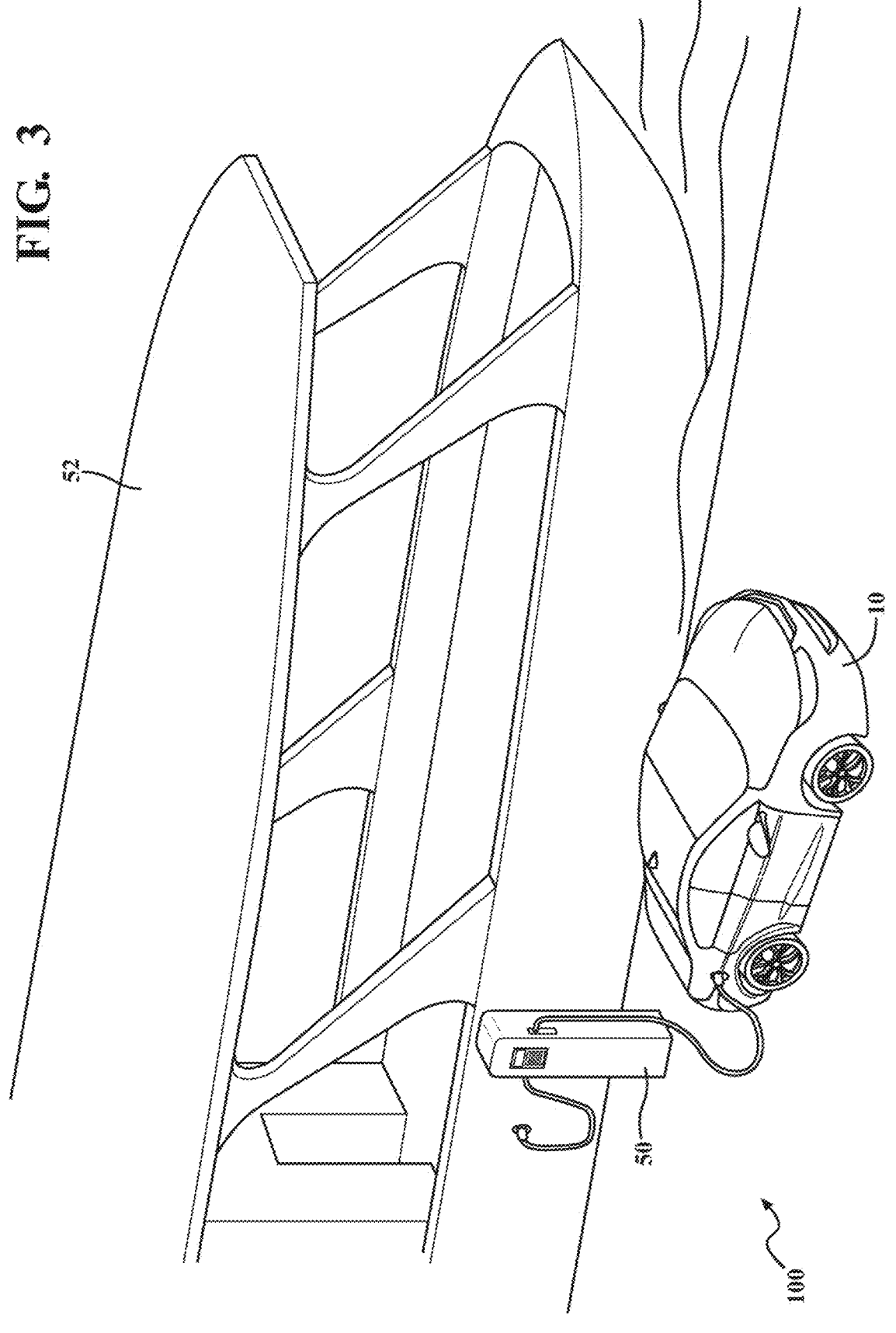
FIG. 3 is a perspective view of the vehicle of FIG. 1 and a ferry coupled to a battery transfer station.

Transport companies such as ferry operators often impose state-of-charge limitations on electric vehicles—such as the vehicle 10—prior to the vehicle 10 being allowed to be loaded onto a transport vehicle such as a ferry (FIG. 3). In some examples, the state-of-charge limitation requires a vehicle battery life to be less than 60% of a full charge. In other examples, the state-of-charge limitation requires the vehicle battery life to be between 10%-55% of a full charge. In still other examples, the state-of-charge limitation requires the vehicle battery life to be between 20%-50% of a full charge. In still other examples, the state-of-charge limitation requires the vehicle battery life to be between 20%-40% of a full charge. Additionally, the state-of-charge limitation may be based on the particular chemistry of the battery 12 such that the state-of-charge limitation may be variable from vehicle to vehicle. Moreover, the state-of-charge limitation may be gathered, stored, and/or determined by the vehicle processor 200 and/or the vehicle server 300.

The vehicle processor 200 is also configured to store vehicle battery life information. The vehicle battery life information generally pertains to the amount of vehicle battery life the battery 12 has remaining. Additionally, the vehicle battery life information may be affected by one or more of the vehicle event data 206, the vehicle mode 208, and the vehicle location 204. Moreover, the vehicle battery life information may include whether the vehicle 10 is within the state-of-charge limitation that may be implemented by a transport company along the route. For example, the vehicle battery life information may include whether the vehicle battery life is within the acceptable state-of-charge limitation of a ferry along the route. As described in more detail below, the server 300 may determine the vehicle battery life information, which may be stored in the vehicle processor 200 and also may be displayed on a dashboard of the vehicle 10.

With further reference to FIGS. 1-6, the server 300 is configured as a network and/or a cloud-based system that communicates with the vehicle processor 200. It is also contemplated that the vehicle processor 200 may communicate any or all of the vehicle data 202 to the server 300 for further processing and/or evaluation. Moreover, the vehicle processor 200 and/or the server 300 may continuously and/or regularly update such that the vehicle data 202 is updated in real time.

The server 300 may also be configured to communicate with third-party processors 500 to collect third-party data. For example, the third-party processors 500 may include, but are not limited to, vehicle processors 200 along the route. Additionally or alternatively, the third-party processors 500 may include third-party user devices such as, for example, cellular phones and/or tablets within vehicles along the route. Further, the third-party processors 500 may include third-party databases such as databases including ferry schedules, weather information, and/or water conditions. It is generally contemplated that the third-party data may include information related to one or more of the vehicle location 204, the vehicle event data 206, and/or the vehicle mode 208 from the third-party processors 500.

Referring still to the example shown in FIGS. 1-6, the server 300 is configured to determine whether the vehicle 10 and, more specifically, the vehicle battery 12, will be in compliance with the state-of-charge limitation when the vehicle 10 reaches the transport vehicle requiring the state-of-charge limitation. The determination of whether the vehicle battery 12 will be in compliance with the state-of-charge limitation may be based on one or more of the vehicle location 204, the vehicle event data 206, and the vehicle mode 208. For example, if a user inputs their desired destination into the processor 200, and the route to get to the desired destination includes a ferry or other transport vehicle requiring a certain state-of-charge, the server 300 will calculate the vehicle battery life when the vehicle 10 reaches the transport vehicle (i.e., a dock associated with the ferry) under normal operating conditions. To make the calculation, the server 300 may also use the vehicle data 202 such as traffic information and weather information as factors in its determination as increased traffic may require additional energy from the vehicle battery 12 and weather information may influence typical vehicle mode 208 operations during transit, such as heat, air conditioning, windshield wipers, increased traction control needed, etc. The calculated vehicle battery life information will then be subtracted from the current vehicle battery life to determine whether the vehicle battery 12 will be in compliance with a state-of-charge limitation when the vehicle 10 reaches the transport vehicle requiring the state-of-charge limitation.

Additionally, the server 300 is configured to start battery depletion activities if it is determined that the vehicle battery 12 will not be within the state-of-charge limitation at the time of arrival to the transport vehicle. The battery depletion activities may be activated simultaneously with driving towards the transport vehicle location to increase battery usage and, thus, allow the vehicle 10 to be within the state-of-charge limitation when it reaches the transport vehicle location. The battery depletion activities may include one or more of enabling max accessory loads including one or more of a chiller operation increase or an increase in coolant flow rate, additional vehicle imaging, activating vehicle sensors to a high-load mode, activating discharge of cell groups by activating cell balancing resistors, and activating inefficient operation of vehicle components including one or more of a vehicle motor or vehicle inverter.

Moreover, the server 300 may be configured to select which of the battery depletion activities to actuate. The determination of which battery depletion activities to actuate may be based on one or more of the vehicle location 204, the vehicle event data 206, and the vehicle mode 208. For example, if the server 300 determines that the vehicle battery 12 will not be within the state-of-charge limitation at the time of arrival of the vehicle 10 at the transport vehicle (i.e., the ferry shown in FIG. 3), the server 300 may calculate the additional energy used by each of the battery depleting activities and select one or more battery depleting activities to allow the vehicle battery 12 to be within the state-of-charge limitation at the time of arrival at the transport vehicle. If the server 300 determines, for example, that the vehicle battery 12 will not be within the state-of-charge limitation at the time of arrival of the vehicle 10 at the transport vehicle, the server 300 may determine that increasing the coolant flow rate will allow the vehicle battery 12 to be within the state-of-charge limitation at the time of arrival. If so, the server 300 may activate the increase in coolant flow until the vehicle 10 reaches the transport vehicle or until the server 300 determines that the vehicle battery 12 will be within the state-of-charge limitation at the time of arrival to the transport vehicle.

Referring still to the example shown in FIGS. 1-6, the server 300 may also be configured to continue battery depletion activities until the vehicle 10 is in compliance with the state-of-charge limitation. As such, if needed, battery depletion activities may continue once the vehicle 10 has reached the transport vehicle. For example, if the vehicle battery 12 is not yet in compliance with the state-of-charge limitation when the vehicle 10 reaches a parking lot of the transport vehicle, the vehicle 10 will continue battery depletion activities until the state-of-charge limitation is reached. The battery depletion activities may occur while the vehicle 10 is parked or otherwise idle waiting for the transport vehicle.

Figure 2:
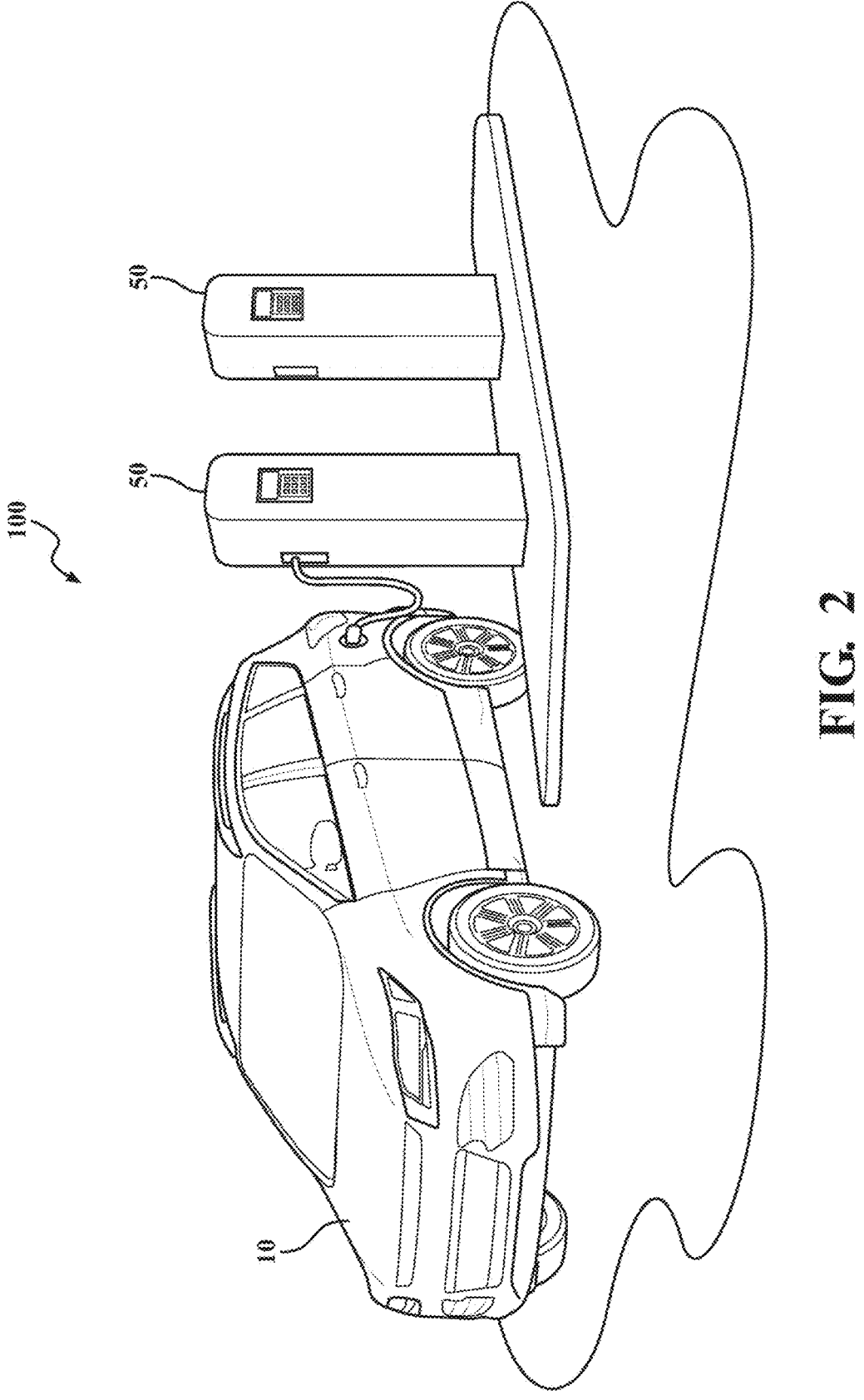
FIG. 2 is a perspective view of the vehicle of FIG. 1 coupled to a battery transfer station.
Figure 4:
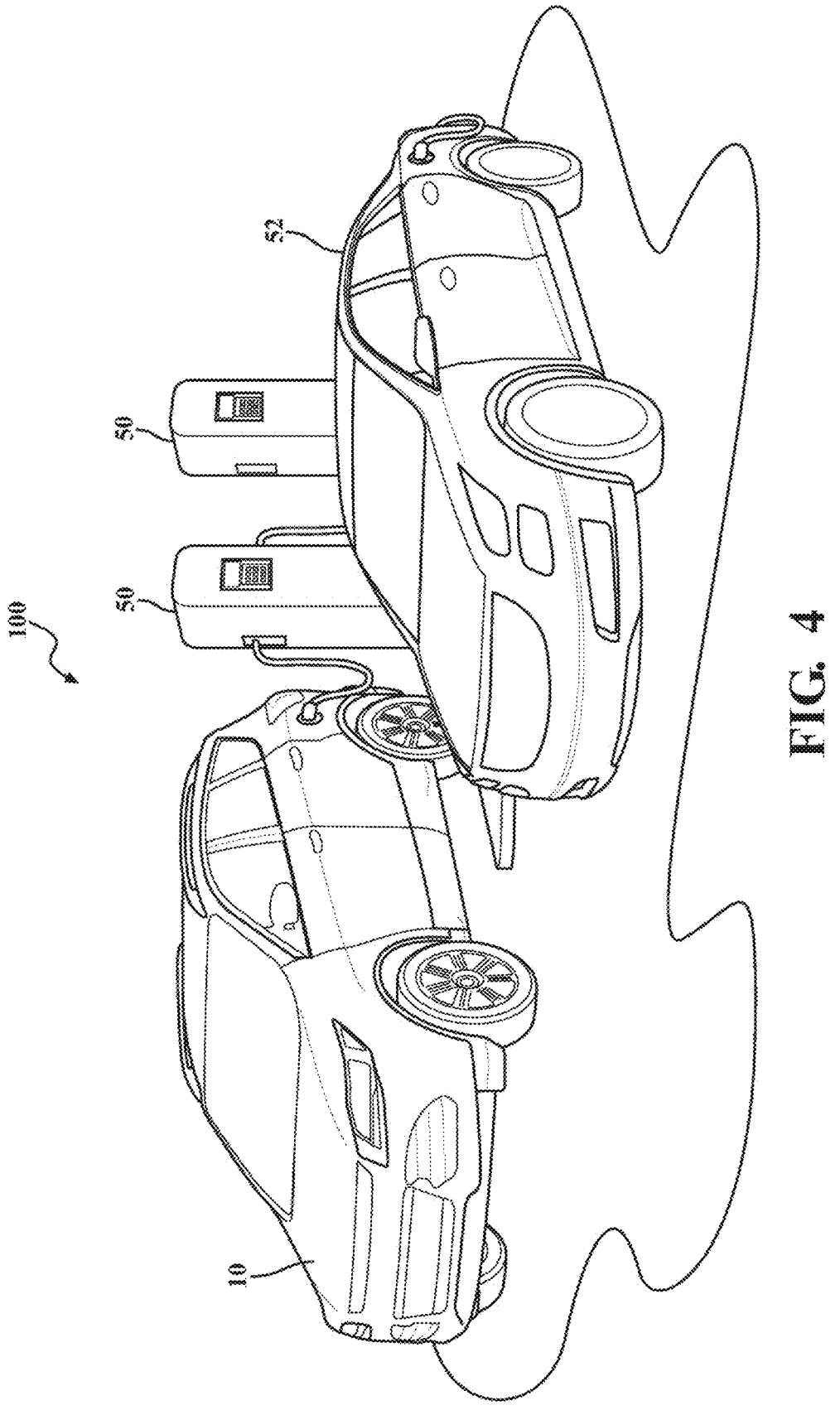
FIG. 4 is a perspective view of the vehicle of FIG. 1 and a second land vehicle coupled to a battery transfer station.

Referring now to the examples shown in FIGS. 2-4, the server 300 may additionally and/or alternatively be configured to transfer energy from the vehicle battery 12 to a transfer station 50. The transfer station 50 may be a stationary station disposed near the transport vehicle location. Additionally, the transfer station 50 may be similar to typical electric vehicle charging stations such that the transfer station 50 includes energy storage devices and a coupling mechanism to couple the vehicle 10 to the transfer station 50 (see FIG. 2). The transfer station 50 is configured to offload energy from the vehicle battery 12 and store the energy within the transfer station 50. More specifically, one or more of the transfer station 50 and/or the server 300 is configured to offload energy from the vehicle battery 12 until the vehicle battery 12 is in compliance with the state-of-charge limitation. Once received by the transfer station 50, the transferred energy may be sent back to a power grid. Additionally or alternatively, the transfer station 50 may also be configured to transfer energy offloaded from the vehicle battery of one vehicle 10 to a battery of a second vehicle 52 (see FIGS. 3 and 4). For example, once the first vehicle 10 offloads energy from the vehicle battery 12, the transfer station 50 stores that energy. A second vehicle 52, for example, a vehicle that is getting off of the transport vehicle, may want additional energy. Accordingly, the second vehicle 52 may be coupled to the transfer station 50 to receive the stored energy (see FIG. 4) from the vehicle 10. Additionally, the second vehicle 52 may be the transport vehicle itself, such as the ferry (see FIG. 3). It is also contemplated that instead of using a transfer station 50, the first vehicle 10 may be able to transfer energy from the vehicle battery 12 directly to the vehicle battery of the second vehicle 52 including the second land vehicle or the transport vehicle, such as the ferry.

Additionally, the determination of whether to transfer energy from the vehicle battery 12 to the transfer station 50 is based on the vehicle location 204 and the vehicle event data 206. For example, the server 300 may be configured to determine that previously undertaken battery depletion activities were insufficient to reach the state-of-charge limitation and then may notify the user that they are still not in compliance with the state-of-charge limitation. Further, the server 300 may also notify and/or assist the user in finding the transfer station 50 upon arrival to the transport vehicle location.

In another example, the driver's destination may not be known such that battery depletion activities were not previously activated. However, the server 300 is configured to determine that the vehicle 10 has reached a transport vehicle location and then determine whether the vehicle 10 is in compliance with the state-of-charge limitation. If the vehicle 10 is not in compliance with the state-of-charge limitation, the user will then be notified of nearby transfer stations 50 and will be prompted to go to the transfer station 50 prior to trying to enter the transport vehicle.

Figure 5:
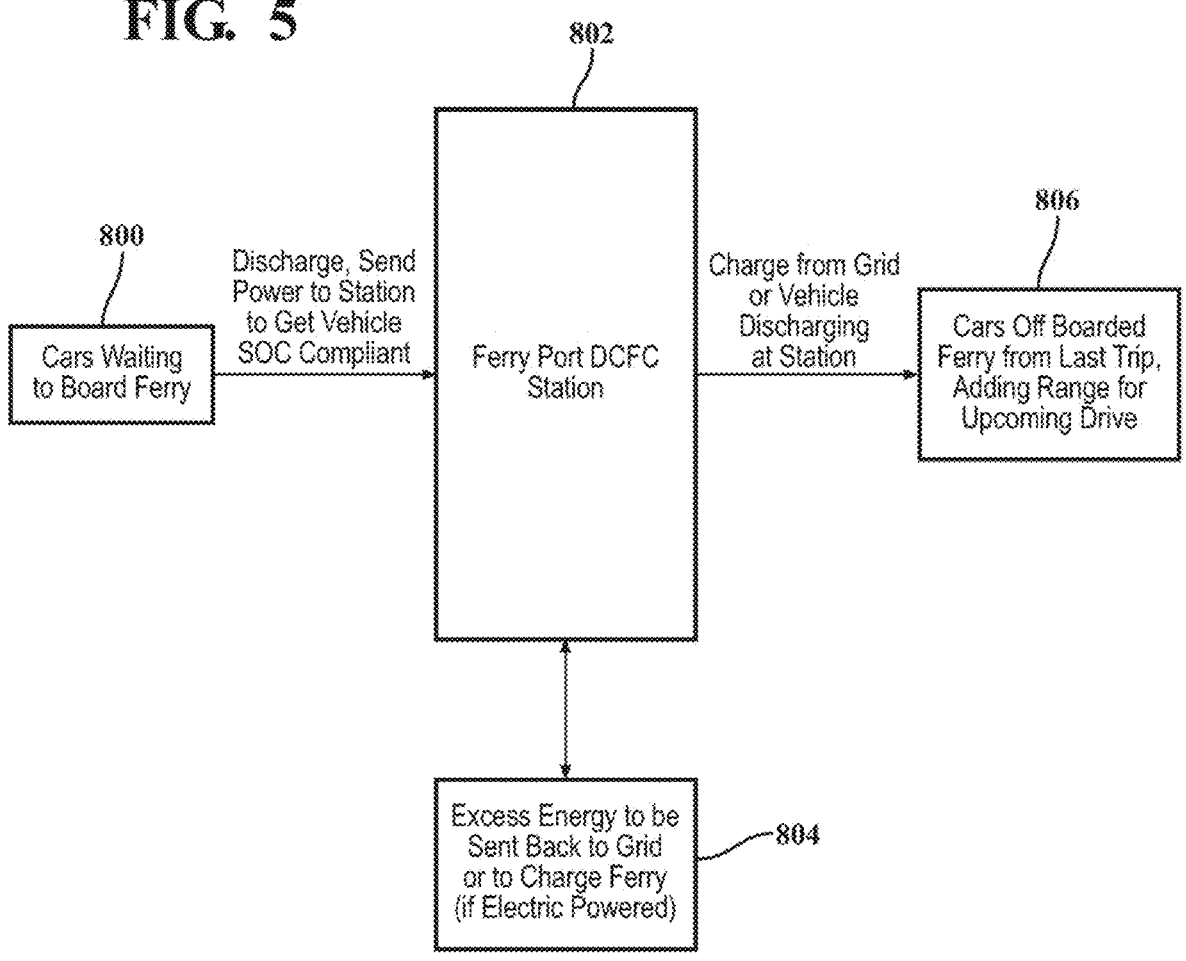
FIG. 5 is an exemplary functional block diagram according to one aspect of the present disclosure.

Referring now to the example illustrated in FIG. 5, the vehicle 10, which has not yet boarded the ferry, may offload energy from the vehicle battery 12 at step 800 to the transfer station 50 in step 802. The transfer station 50 may then either send the excess energy back to the power grid or may send the energy to another vehicle. The other vehicle may be the ferry, if the ferry is an electric vehicle at step 804. Additionally or alternatively, the transfer station 50 may transfer the energy back to vehicles exiting from the ferry to add battery range for their upcoming drive at step 806.

Figure 6:
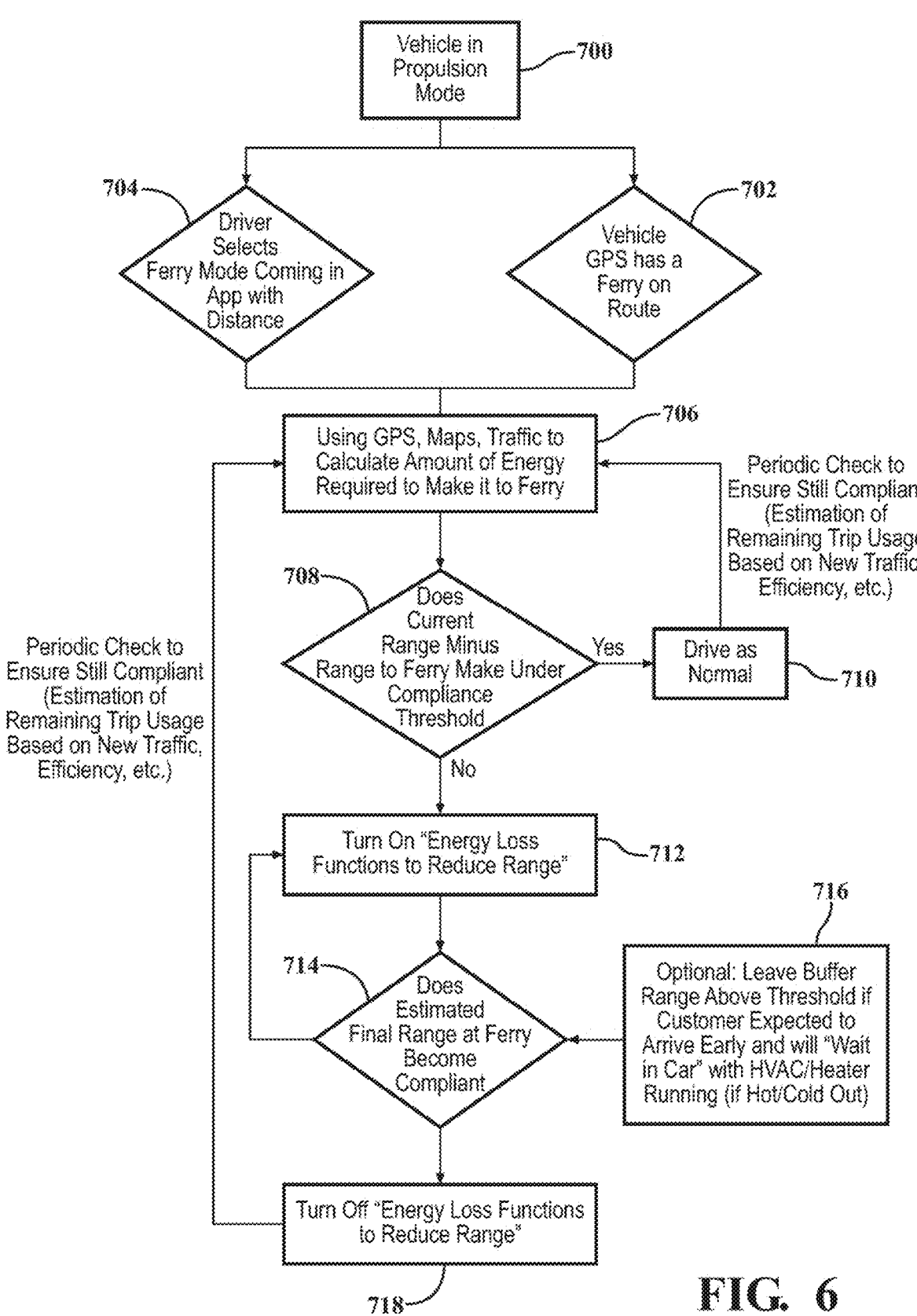
FIG. 6 is an exemplary operational flow chart according to one aspect of the present disclosure.

Referring now to the example illustrated in FIG. 6, the vehicle 10 begins normal operation at step 700. In step 702, the vehicle 10 detects a ferry on the desired vehicle 10 route or in step 704 the driver selects a ferry mode or otherwise inputs the intention to use a ferry for vehicle transport. Next, the server 300 will determine, using GPS, maps, and/or traffic information, the amount of energy required to make it to the ferry at step 706. Then, the server 300 determines whether the current vehicle battery life minus the energy required to make it to the ferry will allow the vehicle battery 12 to be within the state-of-charge limitation of the ferry at step 708. If the vehicle battery 12 will be within the state-of-charge limitation, then the vehicle 10 operates as normal at step 710. However, if the vehicle battery 12 will not be within the state-of-charge limitation at the time of reaching the ferry, the server 300 will activate battery depleting activities to reduce the vehicle battery life at step 712. The server 300 continues determining whether the current vehicle battery life minus the energy required to make it to the ferry will allow the vehicle battery 12 to be within the state-of-charge limitation at the time of reaching the ferry at step 714. Additionally, the server 300 may be configured to leave a buffer range, which is above the state-of-charge limitation, if the user is expected to arrive early and wait in the car at step 716. Moreover, the server 300 may also use weather conditions to determine the buffer range. Once the server 300 determines that the vehicle 10 will be within the state-of-charge limitation upon arrival at the ferry, the server 300 is configured to turn off the battery depletion activities at step 718. The server 300 may continue to determine whether the current vehicle battery life minus the energy required to make it to the ferry will allow the vehicle battery 12 to be within the state-of-charge limitation of the ferry in case of changes to the vehicle data 202.

As the number of electric vehicles using vehicle transporters such as ferries is increasing, many ferry operators are enlisting a state-of-charge limitation for the electric vehicle prior to the vehicle being allowed to be loaded onto a ferry. In order to avoid aimlessly driving around a ferry dock to comply with state-of-charge limitations imposed by ferry operators, the vehicle system 100 as described herein efficiently uses battery energy without adding time or hassle to the user on the route. The vehicle system 100 also provides for the vehicle 10 to be coupled to a transfer station 50 to offload additional energy if needed. This energy may then be transferred to a second land vehicle 52 exiting the ferry or to the ferry itself providing efficient energy transfer.

A number of implementations have been described. Nevertheless, it will be understood that various modifications may be made without departing from the spirit and scope of the disclosure. Accordingly, other implementations are within the scope of the following claims.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. A vehicle system comprising:

a vehicle processor for storing vehicle data including vehicle event data, vehicle mode, and vehicle location, wherein the vehicle location includes one or more of current vehicle location, route information, or traffic information; and a server communicatively coupled to the vehicle processor and configured to:

determine, based on the vehicle data, that a vehicle incorporating the vehicle system is to be transported on a transport vehicle;

determine that a state-of-charge of the vehicle exceeds a state-of-charge limitation of the transport vehicle; and based on determining that the state-of-charge of the vehicle exceeds the state-of-charge limitation of the transport vehicle:

start battery depletion activities of the vehicle based on the vehicle location and the vehicle event data, wherein the battery depletion activities include one or more of enabling max accessory loads including one or more of a chiller operation increase or an increase in coolant flow rate, additional vehicle imaging, activating vehicle sensors to a high-load mode, activating discharge of cell groups by activating cell balancing resistors, and activating inefficient operation of vehicle components including one or more of a vehicle motor or vehicle inverter; and continue the battery depletion activities until the state-of-charge of the vehicle is in compliance with the state-of-charge limitation of the transport vehicle.

2. The vehicle system of claim 1, wherein the vehicle location also includes one or more of Global Positioning System (GPS) location and weather information.

3. The vehicle system of claim 1, wherein the server is configured to determine an amount of energy required to get to a vehicle destination to determine if a vehicle battery will be below a certain battery charge level upon arrival at the vehicle destination.

4. The vehicle system of claim 1, wherein the vehicle location includes route information indicating ferry transport along a route.

5. The vehicle system of claim 1, wherein the server is configured to continue the battery depletion activities until the state-of-charge of the vehicle is between 20%-50% of a maximum charge.

6. A vehicle incorporating the vehicle system of claim 1.

7. A vehicle system comprising:

a vehicle processor for storing vehicle data including vehicle location and vehicle event data; and a server communicatively coupled to the vehicle processor and configured to:

determine, based on the vehicle data, that a vehicle incorporating the vehicle system is to be transported on a transport vehicle;

determine that a state-of-charge of the vehicle exceeds a state-of-charge limitation of the transport vehicle; and based on determining that the state-of-charge of the vehicle exceeds the state-of-charge limitation of the transport vehicle:

start a transfer of energy from a vehicle battery of the vehicle to a transfer station based on the vehicle location and the vehicle event data; and continue the transfer of energy until the state-of-charge of the vehicle is in compliance with the state-of-charge limitation of the transport vehicle.

8. The vehicle system of claim 7, wherein the vehicle location includes one or more of current location, route information, and traffic information.

9. The vehicle system of claim 7, wherein the server is configured to continue the transfer of energy until the state-of-charge of the vehicle is between 20%-50% of a maximum charge.

10. The vehicle system of claim 7, wherein the transfer station is configured to transfer the energy from the vehicle battery to a battery of a second vehicle.

11. The vehicle system of claim 10, wherein the second vehicle is a ferry.

12. The vehicle system of claim 10, wherein the second vehicle is a land vehicle.

13. A vehicle incorporating the vehicle system of claim 7.

14. A vehicle system comprising:

a vehicle processor for storing vehicle data including vehicle location and vehicle event data; and a server communicatively coupled to the vehicle processor and configured to:

determine, based on the vehicle data, that a vehicle incorporating the vehicle system is to be transported on a transport vehicle;

determine that a state-of-charge of the vehicle exceeds a state-of-charge limitation of the transport vehicle; and based on determining that the state-of-charge of the vehicle exceeds the state-of-charge limitation of the transport vehicle:

start a transfer of energy from a vehicle battery of the vehicle to a second vehicle based on the vehicle location and the vehicle event data; and continue the transfer of energy until the state-of-charge of the vehicle is in compliance with the state-of-charge limitation of the transport vehicle.

15. The vehicle system of claim 14, wherein the server is configured to transfer energy from the vehicle battery to a transfer station before the energy is transferred to the second vehicle.

16. The vehicle system of claim 14, wherein the server is configured to transfer energy from the vehicle battery until the vehicle is in compliance with ferry transportation regulations.

17. The vehicle system of claim 14, wherein the server is configured to continue the transfer of energy until the state-of-charge of the vehicle is between 20%-50% of a maximum charge.

18. A vehicle incorporating the vehicle system of claim 14.

* * * * *